No. 694,184. Patented Feb. 25, 1902.
J. W. PACKARD & W. A. HATCHER.
VEHICLE BRAKE.
(Application filed Oct. 29, 1900.)
(No Model.)
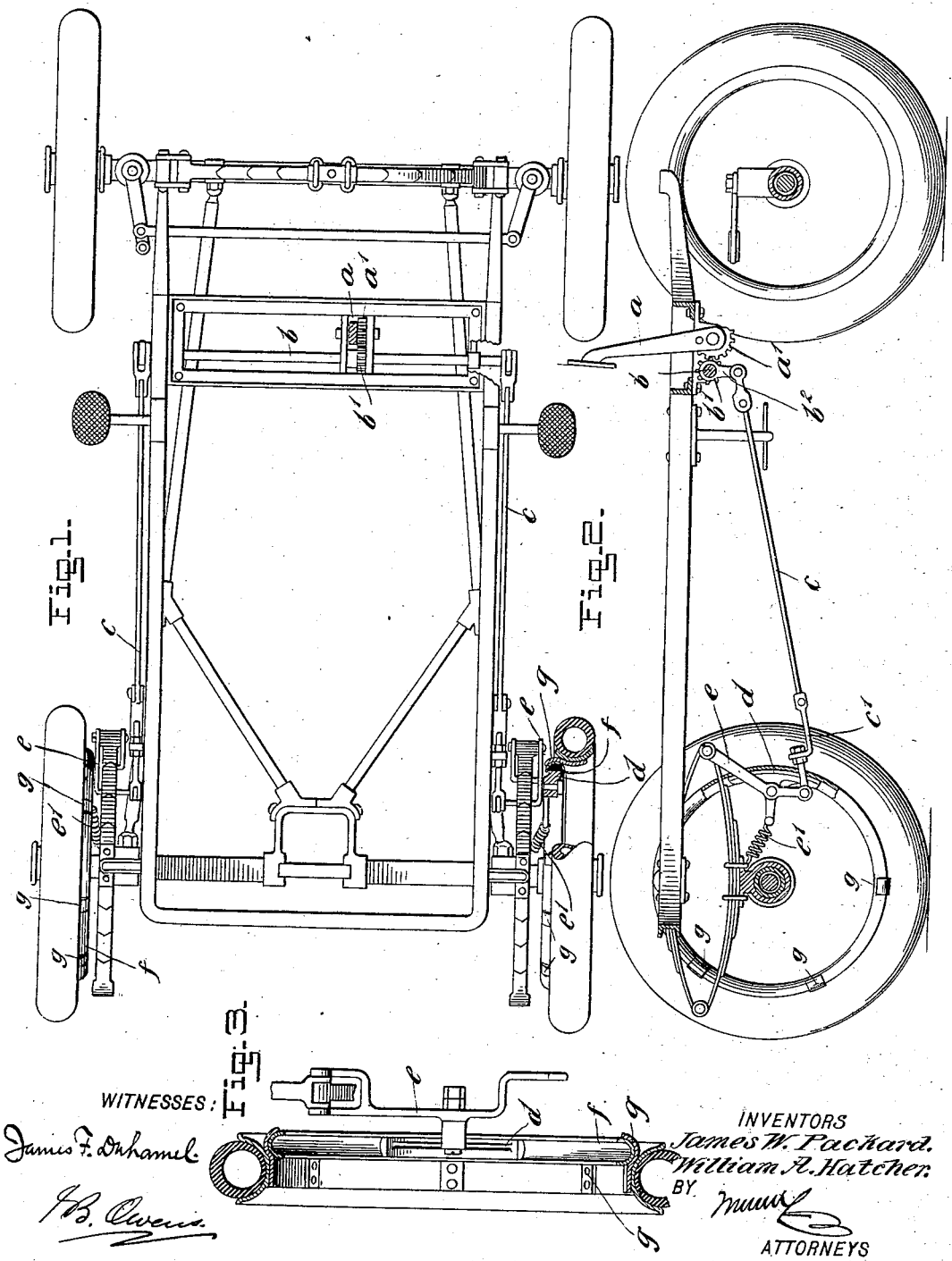
WITNESSES:
James F. Duhamel.
J. B. Owens.
INVENTORS
James W. Packard.
William A. Hatcher.
BY
ATTORNEYS
THE NORRIS PETERS CO., PHOTO-LITHO., WASHINGTON, D. C.

UNITED STATES PATENT OFFICE.

JAMES W. PACKARD AND WILLIAM A. HATCHER, OF WARREN, OHIO.

VEHICLE-BRAKE.

SPECIFICATION forming part of Letters Patent No. 694,184, dated February 25, 1902.

Application filed October 29, 1900. Serial No. 34,742. (No model.)

*To all whom it may concern:*

Be it known that we, JAMES W. PACKARD and WILLIAM A. HATCHER, citizens of the United States, and residents of Warren, in the county of Trumbull and State of Ohio, have invented a new and Improved Vehicle-Brake, of which the following is a full, clear, and exact description.

This invention relates to a brake designed especially for automobiles, in which connection it is here shown, although it is obvious that it could be applied to other vehicles without departing from the spirit of the invention.

The brake comprises a shoe with certain special devices for hanging and actuating it, the shoe coacting with the inner periphery of an annular brake-rim fastened directly to the inner periphery of the rim of a wheel at one side of the spokes by means of brackets attached to the inner periphery of the wheel and to the outer periphery of the brake-rim.

This specification is a specific disclosure of one form of the invention, while the claims define the actual scope thereof.

Reference is to be had to the accompanying drawings, forming a part of this specification, in which similar characters of reference indicate corresponding parts in all the views.

Figure 1 is a plan view of the running-gear of an automobile vehicle to which our invention is applied, parts being shown in section. Fig. 2 is a longitudinal section of the same; and Fig. 3 is a sectional view of one of the wheels, showing a part of the brake in elevation.

The brake is here shown as applied to the two rear wheels of a vehicle, although it is obvious that it may be applied to only one wheel and that it may be the front or rear wheel, as desired. We consider the arrangement shown, however, preferable. The brake is operated by a foot-lever $a$, mounted to swing on an axis below the flooring of the vehicle and provided with a toothed sector $a'$, the axis of which is coincident with the axis of the foot-lever. This sector $a'$ engages with a pinion $b'$ on a transverse shaft $b$, mounted below the floor of the vehicle and provided at each end with a downwardly-projecting arm $b^2$, attached to a rod or other connection $c$, which extends rearward to the rear wheels, as shown in Fig. 2.

The brake-shoes $d$ are carried, respectively, on levers $e$, which are fulcrumed at their upper ends on the front ends of the elliptical springs of the vehicle. Retractile springs $e'$ are connected with the levers $e$ and with the rear axle of the vehicle, and these springs tend to move the levers rearward and disengage the brake-shoes from the wheels, the springs normally holding the brakes released. The rods $c$ are attached by suitable connections $c'$ to the lower ends of the levers $e$, and when the foot-lever $a$ is thrown forward it turns the shaft $b$, so that the rods $c$ are drawn forward, and this movement being transferred to the levers $e$ and brake-shoes $d$ the latter are moved forward into active position. The brake-shoes act against annular brake-rims $f$, the cross-sectional form of which is essentially semicircular or concavo-convex, the concave sides being inward. The brake-rims are attached to the inner peripheries of the wheels through the medium of brackets or other fastening devices $g$. These brackets are riveted to the inner peripheries of the vehicle-wheels and to the outer peripheries of the brake-rims, and at the points where the brackets engage the brake-rims the brackets are curved to conform to the curvature of the rims. The auxiliary rims are therefore located at the inner sides of the wheels out of the way of the spokes thereof and in position to be properly engaged by the brake-shoes in the manner illustrated in the drawings. By this arrangement the brakes may be applied effectively and the movements of the vehicle completely controlled. At the same time it does not necessitate the application of the brakes to the pneumatic tires of the wheel, which is known by persons skilled in the art to be detrimental to the tires. The auxiliary rim $f$ may be made detachable, if so desired; but this is non-essential so far as our invention is concerned.

Having thus described our invention, we claim as new and desire to secure by Letters Patent—

1. A vehicle provided with a wheel having an outer concave bearing-surface, and a concave rim attached to the inner side thereof at one side of the plane of the spokes, said rim having its concave side inward for the purpose specified.

2. A vehicle provided with a wheel having an outer concave bearing-surface, a concave rim attached to the inner side thereof, said rim having its concave side inward for the purpose specified, a brake-lever fulcrumed to the vehicle-spring, a brake-shoe bearing on said concave rim, and a spring for retracting the lever and shoe, said spring being attached adjacent to the axle of the wheel.

3. A vehicle-brake comprising an annular brake-rim adapted to be engaged by the brake-shoe, and located at one side of the spokes of the wheel directly adjacent to the inner periphery of the rim of the same, and brackets attached to the inner periphery of the wheel and to the outer periphery of the brake-rim to hold the brake-rim in place.

4. A vehicle-brake, comprising an annular brake-rim adapted to be engaged by the brake-shoe, said rim being located at one side of the wheel, and brackets attached to the wheel and projecting laterally to the brake-rim, whereby to hold the brake-rim in place.

In testimony whereof we have signed our names to this specification in the presence of two subscribing witnesses.

JAMES W. PACKARD.
W. A. HATCHER.

Witnesses:
M. S. ANDREWS,
ROBT. E. GORTON.